United States Patent [19]

Snyder

[11] 4,315,303
[45] Feb. 9, 1982

[54] DC CONVERTER

[75] Inventor: Donald W. Snyder, Napa, Calif.

[73] Assignee: Real Gas & Electric Company, Inc., Santa Rosa, Calif.

[21] Appl. No.: 103,371

[22] Filed: Dec. 13, 1979

[51] Int. Cl.³ .......................................... H02M 3/335
[52] U.S. Cl. ...................................... 363/21; 363/56; 363/80
[58] Field of Search ...................... 363/20, 21, 23, 28, 363/56, 57, 80, 96, 97

[56] References Cited

U.S. PATENT DOCUMENTS

| T950,004 | 9/1976 | Tuttle | 363/56 X |
|---|---|---|---|
| 3,514,688 | 5/1970 | Martin | 363/20 X |
| 3,562,623 | 2/1971 | Farnsworth | 363/20 |
| 4,013,935 | 3/1977 | Siepmann et al. | 363/56 X |
| 4,124,884 | 11/1978 | Episcopo | 363/21 |
| 4,195,333 | 3/1980 | Hedel | 363/21 |

Primary Examiner—William M. Shoop
Attorney, Agent, or Firm—Alvin E. Hendricson

[57] ABSTRACT

A small and inexpensive converter unit produces regulated multi-level low voltage DC power from a widely fluctuating high voltage DC input with short circuit protection and low current drain under no load conditions.

6 Claims, 1 Drawing Figure

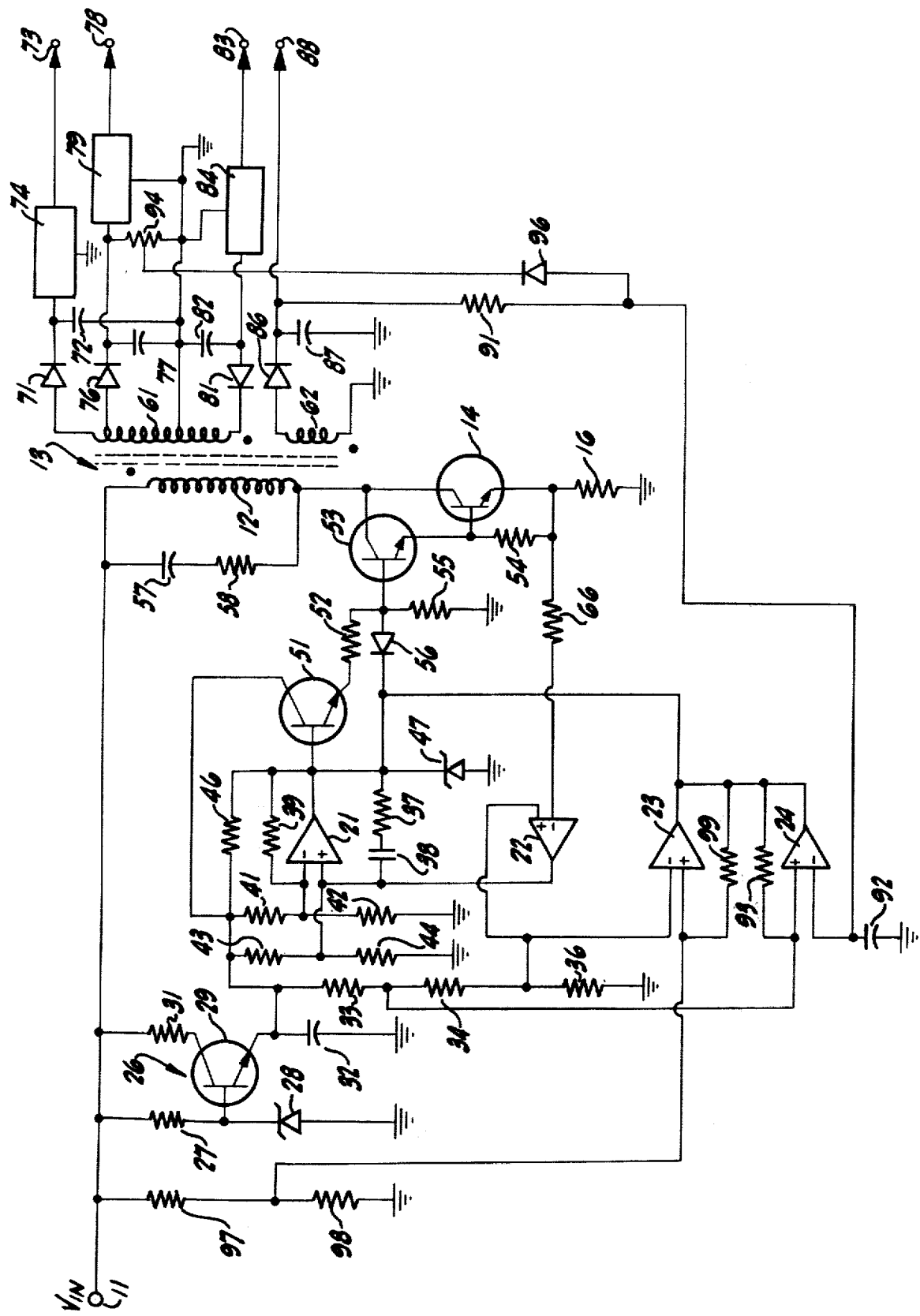

DC CONVERTER

BACKGROUND OF INVENTION

Numerous DC converters have been developed for raising or lowering the level of DC voltages for different applications, however, such converters are usually designed to operate upon fixed or at most mildly varying input voltages. Some electrical systems, such as, for example, wind powered generators produce widely fluctuating voltages and conventional converters are not designed to handle the problems arising from substantial variations of input voltage. A system producing voltages varying from 0 V DC to 200 V DC poses numerous problems well beyond the capabilities of conventional converters to produce regulated DC outputs therefrom.

The present invention is particularly directed to the inexpensive production of multi-level regulated DC voltages from DC input voltages that may fluctuate as much as in the foregoing example.

SUMMARY OF INVENTION

The converter of the present invention incorporates a fly-back transformer action to charge output filter capacitors under the control of a plurality of comparators, with the latter preferably being provided as a single integrated circuit. The comparators have open collector outputs so they may be switched between internal grounding and ungrounding of the outputs in accordance with the relative values of the inputs.

The preferred embodiment of the invention employs four comparators having functions of oscillator, peak current limiter, low input voltage control and output voltage control. The latter two comparators have parallel connected outputs so that either function operates a transistor switch to prevent transformer coupling to the converter outputs. The peak current limiter is coupled in the oscillator circuit to control the duration of each oscillator pulse. Comparison voltages are obtained from tapped resistors in the input and in the output of a voltage regulator circuit in the input.

DESCRIPTION OF FIGURES

The present invention is illustrated as to a single preferred embodiment in the sole FIGURE of the accompanying drawing.

DESCRIPTION OF PREFERRED EMBODIMENT

The present invention is particularly adapted for assembly from readily available low cost parts, and may typically be mounted on a small PC board so as to take up very little space. A converter having a major output of 5 amp. at 5 volts may typically require only 15 Sq. inches of space on a PC board.

Referring now to the drawing illustrating a preferred embodiment of the present invention, there will be seen to be shown an input terminal 11 also labelled $V_{IN}$ connected through the primary winding 12 of a transformer 13 to a switching transistor 14, that in turn, is grounded through a resistor 16. Input voltage is applied between the input terminal 11 and electrical ground and it is assumed that $V_{IN}$ is positive. The converter is controlled by a plurality of comparators 21, 22, 23 and 24, which are preferably provided as an integrated quad comparator on a single chip. It is particularly noted that each of these comparators comprise an amplifier having an open collector output. Such a comparator operates to ground the output when the negative input becomes more positive than the positive input, and to unground the output when the negative input is less positive than the positive input. Each of the comparators compares the two input signals and internally either grounds or ungrounds the output depending upon the relative values thereof.

The circuit of the present invention, as illustrated includes a voltage regulator 26 having a resistor 27 connected to input terminal 11 and connected through a zener diode 28 to ground for setting the potential of the base of a transistor 29 which is connected to the junction of the resistor and zener diode. The collector of the transistor 29 is connected through a resistor 31 to the input terminal 11 and the emitter of this transistor is connected to ground through a capacitor 32. The output of the voltage regulator 26 at the emitter of transistor 29 is connected to one end of a voltage divider comprising resistors 33, 34 and 36 connected in series to ground.

Comparator 21 is connected as an oscillator with a resistor 37 connected in series with a capacitor 38 between the output of the comparator and the positive input thereof. A resistor 39 is connected between the output of the comparator and the negative input thereof. This negative input is also connected to the juncture of a pair of resistors 41 and 42 connected in series between the output of the voltage regulator 26 and ground. The value of the resistors 39, 41 and 42 are chosen to establish the desired wave shape of the output from the comparator 21. A pair of resistors 43 and 44 are connected in series between the output of the voltage regulator 26 and ground and the juncture thereof is connected to the positive input of the comparator 21. A further resistor 46 is connected between the output of the comparator 21 and the output of the voltage regulator 26 for charging capacitor 38 and providing a pull-up action at the output of comparator 21. The circuit described above will operate as an oscillator because of the positive feedback through capacitor 38 and resistor 37, and the frequency of oscillation is determined by resistors 39, 41, 42, 43 and 44, together with capacitor 38. A zener diode 47 is connected in a reverse conducting direction between the output of the oscillator 21 and ground for limiting the peak output voltage of this portion of the circuit.

A transistor amplifier 51 is provided with the base thereof connected to the output of the comparator 21 with the collector connected to the output of the voltage regulator 26 and the emitter connected through a resistor 52 to the base of a transistor 53 which operates together with transistor 14 for switching power. The transistor 53 has the collector thereof connected to the collector of transistor 14, and the emitter thereof connected to the base of transistor 14 with this latter connection being coupled through a resistor 54 to the junction of the resistor 16 and emitter of transistor 14. In addition to the foregoing, there is provided a diode 56 connected to conduct from the base of switching transistor 53 back to the output of the comparator 21 and a resistor 55 grounding the base of transistor 14.

The circuit described above will oscillate to turn the switching transistors 14 and 53 on and off at a high rate. A capacitor 57 is connected in series with a resistor 58 across the primary winding 12 of the transformer 13 and the transformer has secondary windings 61 and 62 oriented with respect to the primary winding 12 as indicated, for energizing the secondary windings when the primary winding is deenergized, i.e. current flow therethrough is stopped. Although this operation will produce DC output voltages, the present invention provides control thereover, first by means of comparator 22 which has the negative input thereof connected through a resistor 66 to the ungrounded end of resistor 16, and the positive input connected to the juncture of voltages dividing resistors 34 and 36. As the voltage across resistor 16 builds up by current flowing through the primary of transformer 13 and through this resistor, it will reach a limiting voltage sufficient to operate comparator 22 and ground the output which is connected to the positive input of the oscillating comparator 21. This then causes the output of comparator 21 to be grounded for terminating the positive output pulse therefrom. The output of comparator 21 comprises square wave pulses with the pulse duration determined by the time of charging of resistor 16 and the time between pulses determined by the value of capacitor 38.

In addition to the foregoing controls, the present invention furthermore provides for shutting down the circuit should the input voltage fall below a predetermined value, and for controlling operation in accordance with the load of the converter. Before considering these further controls, it is noted that the output circuit of the present invention is relatively straightforward and is shown to include a diode 71 connected from the positive end of transformer winding 61 to ground through a capacitor 72 and to an output terminal 73 through a regulator 74 which may, for example, comprise a conventional three terminal regulator. A regulated output of plus 12 volts may, for example, be provided at terminal 73. A lesser positive voltage is shown to be obtained by connection of another diode 76 from a tap on the winding 61 to ground through a capacitor 77 and to an output terminal 78 through a regulator 79. A regulated output voltage of plus 5 volts may, for example, be provided at terminal 78. A negative output voltage is obtained by connection of the negative end of transformed winding 61 in a reverse conduction through a diode 81 to ground through a capacitor 82, and to an output terminal 83 through a regulator 84. A low voltage high current output is obtained from the other secondary winding 62. To this end a diode 86 is connected from the positive end of the winding 62 to ground through a capacitor 87 and to an output terminal 88 whereat there appears an output voltage of plus 5 volts, for example, with a substantial current capability such as 5 amperes. The negative end of the transformer secondary winding 62 is grounded.

The present invention provides for controlling the operation thereof in accordance with the output voltages and to this end a connection is provided from output terminal 88 through a resistor 91 to the negative input of the comparator 24 which is grounded through a capacitor 92. The comparator 24 has the positive input thereof connected to the juncture of voltage divider resistors 33 and 34 to apply a predetermined voltage thereto and a high value resistor 93 connects the output of the comparator 24 to the positive input to provide a small amount of positive feedback for incorporating a slight delay in operation. The output of the comparator 24 is connected in reverse direction through the diode 56 to the base of the switching transformer 53. Consequently, a high output voltage at terminal 88 will cause comparator 24 to ground the output which, in turn, turns off the switch 53 and 14, so that no power is provided to the secondary of the transformer 13. When the output voltage at terminal 88 falls below a predetermined value, the comparator 24 will unground the output thereof so as to return the circuit to operating condition wherein the switches 14 and 53 are operable in the manner described above.

It will be appreciated that it is possible for a heavy load to be applied to one of the output terminals and not to others, and thus the present invention provides for checking at least one of the low current output voltages by a resistor 94 connected between ground and the output of the diode 76, for example, with a connection from a tap on this resistor 94 in reverse directions through a diode 96 to the negative input of the comparator 24. This provides for grounding the output of the comparator 24 when the voltage at both terminals 78 and 88 rise to a predetermined value. This predetermined output voltage is an indication that the circuit is providing the required output current at regulated output voltages and only when one of the output voltages starts to fall below predetermined value does the circuit of the present invention recommence operation to return this output voltage to desired value.

The present invention also provides protection from low voltage input. Thus if the voltage at input terminal 11 falls below some predetermined minimum, the circuit of the present invention is rendered inoperative in order to prevent damage to elements thereof. Comparator 23 is employed for this purpose and will be seen that the negative input thereof is connected to the juncture of voltage dividing resistors 34 and 36, and the positive input is connected to the juncture of a pair of resistors 97 and 98 connected between input terminal 11 and ground. A high value resistor 99 is shown to be connected from the output of comparator 23 to the positive input in like manner to comparator 22 and for the same purpose. The outputs of comparators 23 and 24 are connected in parallel and thus should the input voltage fall sufficiently to cause the positive input to comparator 23 to fall below the negative input, the output of this comparator will be grounded to consequently ground the base of switching transistor 53 to thereby render this circuit inoperable until the input voltage rises to a value in excess of the predetermined minimum. Typically, this minimum might be 50 volts so that the present invention is capable of handling input voltages varying from zero volts DC to say 200 volts DC, but actually, only operates in the range of plus 50 volts DC input to plus 200 volts DC input.

Operation of the present invention has generally been described in connection with the circuit description above, however a brief resume thereof with some examples of values may be of assistance in understanding the present invention. The series voltage regulator 26 supplies several milliamps of current for the driven circuits when the input voltage is above about 15 volts, for example, and it is noted that the transistor 29 of the regulator 26 must be a high voltage transistor, as full input voltage is applied thereto although resistor 31 limits surge currents thereto. The comparator 21 oscillates because of the positive feedback through resistor 37 and capacitor 38. The circuit design requires resistor 46 for adequate output drive and the small resistor 37 is inserted to provide some decoupling. The diode 47 limits the output of the oscillator in order to limit current through resistor 52 and thus to reduce the overall current drain on the voltage regulator transistor 29. The use of a Darlington power transistor makes it possible to drive the following circuit with only several milliamps of current. If the current through the transformer primary winding 12 is sufficient to raise the potential across resistor 16 to a predetermined level prior to termination of any single positive oscillator pulse, the comparator 22 will operate to terminate the oscillator pulse and otherwise the regular duty cycle of the oscillator will continue. This then provides peak current protection for the circuit. The combination of resistors in the oscillator circuit produces a duty cycle of about 50 percent, for example, and establishes the negative peak of the positive input to comparator 21 at or about zero volts. The foregoing occurs when the drive to the transistors 14 and 53 terminates, and thus, as previously noted, if the peak current causing the predetermined voltage across resistor 16 is reached before the oscillator cycle is ended, comparator 22 resets the positive input of the comparator 21 to approximately the same value, i.e. ground value. Consequently, the transistors 14 and 53 are never allowed to become overloaded.

The comparators 23 and 24 serve to turn off the drive, i.e. energization of the transformer. The foregoing will only occur when the output voltage rises above a predetermined level or the input voltage drops below a predetermined level. It is particularly noted that as the transistors 14 and 53 are turned off, i.e. become non-conducting, the energy in the transformer is released into the secondary and charges the capacitors 72, 77, 82 and 87. The diodes 71, 76, 81 and 86 in the output circuit must be of a fast recovery type, inasmuch as the switching frequency is typically about 20 KHz under heavy load. Under light loads, the pulse rate may be only 40–50 pulses/second. The capacitor 57 and resistor 58 connected across the transformer primary 12 reduce the peak voltage applied across the transistor combination 14–53, when the latter is non-conducting and the diode 56 serves to minimize the time during which current can flow through the transistors 14 and 53 when a substantial voltage exist thereacross. This is important in minimizing requirements of these transistors and preventing damage thereto. As previously noted, the resistors 93 and 99 in the circuits of comparators 23 and 24 provide a small hysteresis or delay to provide improved switching action.

With regard to the output circuit, it is noted that the separate winding 62 is normally formed of a larger wire size in order to handle larger currents expected to be delivered at the output terminal 88. The regulators 74, 79 and 84 may be conventional three terminal regulators for removing ripples from the output voltages.

The present invention, as described above, will be seen to provide an advantageous, low cost, DC to DC converter having particular utility in wind powered generator systems, although it is not limited to such applications. It will be apparent to those skilled in the art that numerous variations and modifications are possible within the spirit and scope of the present invention, and thus it is not intended to limit the invention by the terms of description or details of illustration.

What is claimed is:

1. A converter circuit for producing low voltage regulated DC output current from a DC input that may vary widely with time comprising
    a transformer having a primary winding connected in series with a switch and a resistor across an input,
    a plurality of comparators with a first comparator connected in an oscillator circuit to said input and to control said switch whereby current through the primary winding of said transformer pulses at oscillator frequency and a second comparator connected for control from the juncture of said switch and resistor and having an output connected in said oscillator circuit to limit successive oscillation pulse durations for peak current protection,
    said transformer also having at least one secondary winding connected to an output circuit including a diode and capacitor for the transfer of energy, a termination of each current pulse in the transformer primary winding, and
    a connection from said output circuit to control a third comparator having the output coupled to control said switch for limiting power in the output circuit.

2. The converter of claim 1 further defined by a voltage regulator connected across the convertor input and to voltage divider means, and means connecting comparator inputs to points on said voltage divider means for establishing comparison voltage values for the comparators.

3. The converter of claim 1 further defined by a fourth comparator having an input coupled to the converter input and an output connected to control said switch for disabling the converter at all times the input voltage to the converter is less than a predetermined amplitude.

4. The converter of claim 1 further defined by said switch comprising at least one transistor having control means coupled to the output of the first comparator and coupled through a diode to the output of said third comparator.

5. The converter of claim 1 further defined by a plurality of output circuits connected to different portions of said secondary windings and connections from separate output circuits to said third comparator.

6. The converter of claim 1 further defined by said comparators having open collector outputs, for grounding connected elements upon a first input exceeding a second input.

* * * * *